US 6,726,967 B2

(12) United States Patent
Vorenkamp et al.

(10) Patent No.: US 6,726,967 B2
(45) Date of Patent: Apr. 27, 2004

(54) ADAPTER FOR WELDING OBJECTS TO PLASTIC

(75) Inventors: Erich James Vorenkamp, Pinckney, MI (US); Duane Fish, Fenton, MI (US); Lawrence Eugene Vaughn III, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 144 days.

(21) Appl. No.: 09/921,607

(22) Filed: Aug. 3, 2001

(65) Prior Publication Data

US 2002/0020487 A1 Feb. 21, 2002

Related U.S. Application Data

(60) Provisional application No. 60/224,487, filed on Aug. 11, 2000.

(51) Int. Cl.$^7$ .................. F16B 9/00; B65D 90/02; F16L 41/00; F16L 33/00; B32B 31/20
(52) U.S. Cl. .................. 428/34.1; 428/35.7; 428/36.7; 403/404; 403/199; 403/192; 220/562; 220/601; 220/4.14; 285/141.1; 285/239; 156/309.6; 156/309.9; 156/320; 156/322; 156/73.1
(58) Field of Search .................. 428/34.1, 35.7, 428/36.7; 403/404, 199, 192; 220/562, 601, 4.14; 285/141.1, 239; 156/309.6, 309.9, 320, 322, 73.1

(56) References Cited

U.S. PATENT DOCUMENTS 5,269,251 A * 12/1993 Freeman .................. 116/63 C
5,326,514 A 7/1994 Linden et al.
5,551,400 A * 9/1996 Rice et al. .................. 123/470
5,588,544 A 12/1996 Takashima et al.
5,788,794 A 8/1998 Valyi
6,161,879 A * 12/2000 Ries et al. .................. 285/330
6,193,924 B1 2/2001 Huse

FOREIGN PATENT DOCUMENTS

EP  0 366 129 A1  5/1990
JP  62213156  3/1989

OTHER PUBLICATIONS

U.S. patent application Ser. No. 09/922,059, High Volume Production of Low Permeation Plastic Fuel Tanks using Parallel Offset Twinsheet Pressure Forming, Erich James Vorenkomp et al., filed Aug. 3, 2001.

U.S. patent application Ser. No. 09/921,541, Low Hydrocarbon Emisson Fuel Tank with Internal Components Erich James Vorenkamp et al., filed Aug. 3, 2001.

* cited by examiner

Primary Examiner—Harold Pyon
Assistant Examiner—Chris Bruenjes
(74) Attorney, Agent, or Firm—Brinks Hofer Gilson & Lione

(57) ABSTRACT

An adapter provides for mounting an object on plastic. The adapter comprises a body coupled with at least two feet. The feet are weldable to the surface of the plastic while the plastic is in a molten state. The adapter also includes a coupling mechanism coupled with the body. The coupling mechanism is operable to couple the object with the adapter.

27 Claims, 4 Drawing Sheets

ADAPTER FOR WELDING OBJECTS TO PLASTIC

This application claims the benefit under 35 U.S.C. §119(e) of Provisional U.S. patent application Serial No. 60/224,487 filed on Aug. 11, 2000.

BACKGROUND

1. Field of the Invention

This invention relates to manufacture and forming of plastic, and more particularly to a design and process for welding objects to a surface of the plastic.

2. Description of the Related Art

A multitude of rigid articles are formed from plastic. Many of these articles also include objects that are mounted on the plastic. One such article is a well-known plastic fuel tank. Plastic fuel tanks provide a reservoir of fuel for engines and other fuel consuming devices in land, water and air vehicles. Plastic fuel tanks and other similar articles may be produced with blow molding or thermoforming techniques using high-density polyethylene (HDPE) plastic in monolayer or coextruded form. The plastic used for plastic fuel tanks also includes a hydrocarbon barrier to prevent passage of fuel and associated vapors there through.

Objects in the form of fuel system components are usually added to the plastic fuel tank to create a fuel system. The components may include valves, hoses, pumps, level sensors, structural supports, etc. Typically, some of these components are installed inside the plastic fuel tank by cutting service holes in the tank. In addition, some of the components are installed outside the tank requiring additional holes, grooves and/or recesses.

Recent changes in government regulations have reduced the amount of allowable fuel vapor emissions from fuel tanks. One way to reduce allowable fuel vapor emissions from plastic fuel tanks is through minimization of breaches in the hydrocarbon barrier. Reduction in the number of holes in the plastic fuel tank through internalization of fuel system components minimizes breaches. In addition, internalization of components retains any vapor emissions from the components themselves within the hydrocarbon barrier. One way to internalize fuel system components is to insert the components during manufacture of the plastic fuel tank.

Fuel system components inserted during manufacturing may be fixedly mounted to the interior walls of the plastic fuel tank while the walls are in a molten state. The mounting method is referred to as a hot plate weld process. The process involves embedding a rigid bracket included on the component in the interior wall. Warming the bracket with a hot plate may occur prior to contacting the interior wall to ensure adhesion between the bracket and the wall. The bracket is a thick, flat continuous plate or a flat plate with a waffle pattern thereon. The plate is partially, or completely, submerged in the molten plastic forming the wall. The component is maintained in position until the plastic fuel tank cools and the wall becomes rigid.

Because of temperature differences between the interior wall and the bracket, stresses may develop at the interface between the bracket and the wall as the plastic fuel tank cools. In addition, following manufacture when the plastic fuel tank retains fuel, non-uniform swelling resulting from absorption of fuel by the bracket and the interior wall may create similar stresses. The stresses can lead to failure of the bond formed between the bracket and the wall. Failure of the bond may result in fractures to the wall and/or decoupling of the fuel system component from the wall.

In addition, during manufacturing when the bracket is embedded in the interior wall, the material forming the wall is displaced. Displacement of the material may result in a breach of the hydrocarbon barrier and/or a thin spot in the wall. Further, the displaced material forms a notch feature on the interior wall resembling a ridge or a bead in the area adjacent to the bracket. The notch feature creates a discontinuity in the otherwise continuous plane formed by the wall. The discontinuity introduces forces perpendicular to any tensile/compression forces in the wall. As such, failure of the mounting and/or the interior wall may occur at the notch feature when the wall is placed under a tensile or compression load.

Accordingly, a process and system is needed for mounting objects on plastic that reduces stresses in the bond between the object and the plastic and does not compromise the structural integrity of the plastic.

BRIEF SUMMARY

The present invention is defined by the following claims, and nothing in this section should be taken as a limitation on those claims. By way of introduction, the embodiments described below include a system and process utilizing an adapter to mount an object on plastic while the plastic is in a molten state. The adapter is capable of absorbing stresses by external forces as well as those stresses that may arise as the plastic and the adapter independently shrink and swell. In addition, the adapter is couple to the plastic with a surface weld. The surface weld avoids excessive displacement of the plastic, while minimizing creation of notch features or other structures detrimental to structural integrity.

The adapter includes a body, a coupling mechanism and at least two feet. The body couples the coupling mechanism with the feet. The coupling mechanism couples an object to the adapter. The feet are formed to extend away form the body and include a weld zone for contacting the surface of the plastic. Upon being placed on the surface of the plastic, the weld zone rises in temperature and reaches a molten state. Upon reaching the molten state, the weld zone and the surface of the plastic melt together to bond the object to the plastic.

In one embodiment, the adapter is used to couple at least one fuel system component to a wall of a plastic fuel tank to minimize holes and other breaches of a hydrocarbon barrier formed by the wall. In this embodiment, the adapter, with the fuel system component coupled thereto, is advanced into contact with the surface of the wall while the wall is in a molten state. A weld interface is formed when the weld zone on each of the feet and the wall melt together. The adaptor not only minimizes stresses developed while the wall and the feet cool, but also minimizes stresses created when swelling occurs in the presence of fuel.

An interesting feature of the adapter is the formation and operation of the feet. The feet are formed of flexible material to absorb stresses induced by independent shrinkage and swelling, as well as dynamic loading, of the plastic and/or the adaptor. The feet of one embodiment are formed of plastic resin that becomes progressively thinner toward the weld zone. The relatively thin portion of the feet within the weld zone quickly reaches the molten state due to low thermal mass. Conversely, the relatively thick portion of the feet do not quickly reach a molten state and therefore provide more robust structural support during installation and following cool down.

Another interesting feature of the adapter is the weld zone. The weld zone on each of the feet includes a relatively flat surface and a lip. The relatively flat surface includes substantial surface area to provide a significant contact with the surface of the plastic. The significant contact provided by the substantial surface area maintains the adaptor on the surface and provides a strong bond once a weld occurs. In addition, the substantial surface area limits the penetration depth of the adapter into the surface of the plastic and provides stability for objects coupled to the adapter. The lip avoids compromising the surface of the plastic by presenting a non-invasive edge. The non-invasive edge minimizes both the formation of notch features and the displacement of the molten plastic forming the surface.

Further aspects and advantages of the invention are discussed below in conjunction with the preferred embodiments.

DETAILED DESCRIPTION OF THE PREFERRED EMBODIMENTS

The disclosed embodiments include an adapter to facilitate attachment of an object to plastic. The adapter is flexible, yet rigid, and is strong enough to maintain the position of the object on the plastic. The adapter bonds with a surface of the plastic without significantly changing the topography of the surface. The flexibility of the adapter provides relief of stresses that may otherwise be present at the bond between the adapter and the plastic. The adapter also includes capability to couple the object to the adapter, and hence rigidly attach the object to the plastic. The adapter may be used in any application where plastic may be heated to a molten state and an object coupled thereto.

As used herein, the term "molten state" is defined as the condition of plastic elevated in temperature to a liquid state in which the plastic is formable, adaptable, pliable and capable of bonding by way of welding to a compatible material.

Figure 1:
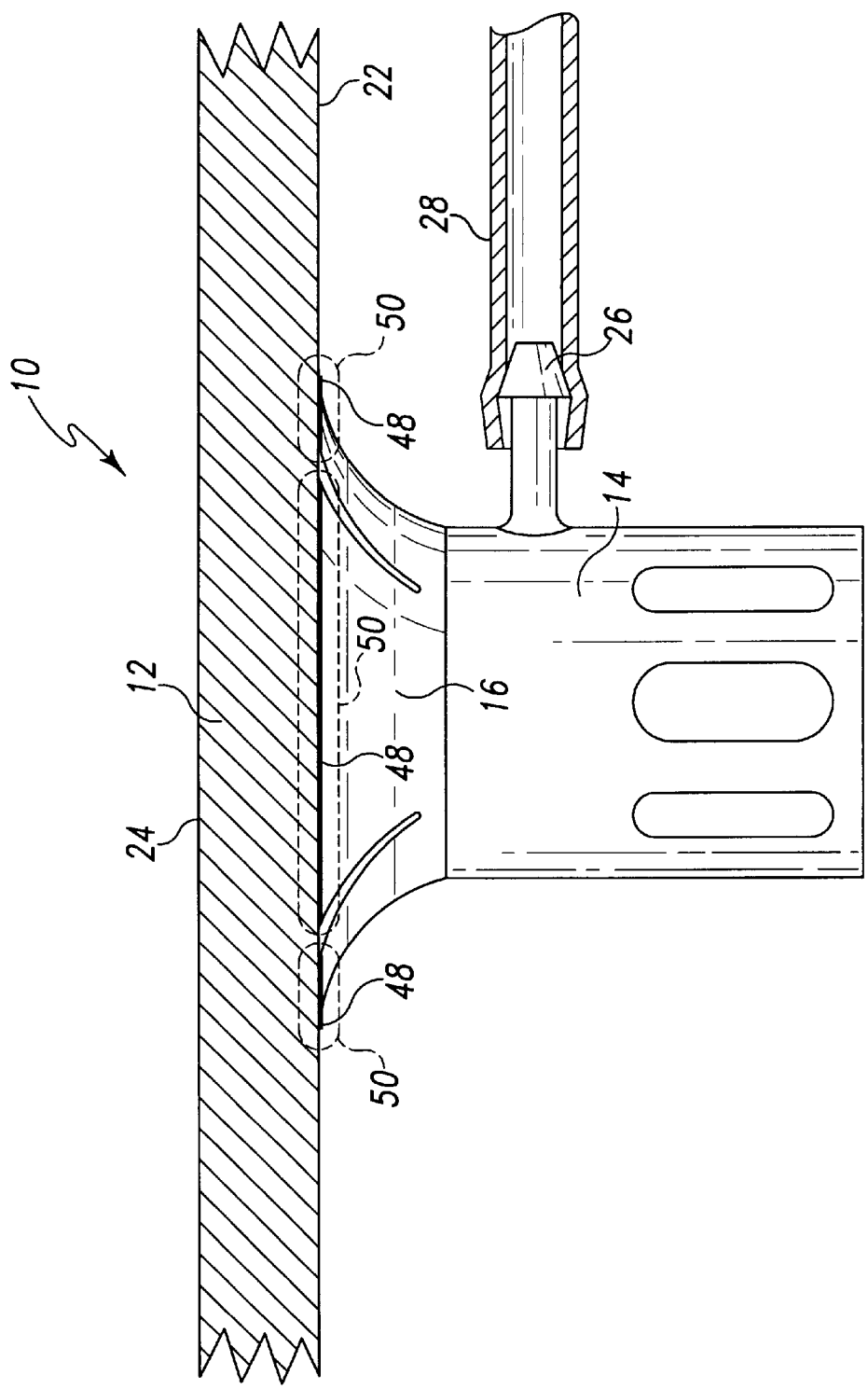
FIG. 1 illustrates an exemplary application of one embodiment of an adapter.

An exemplary application of the adapter is in the area of plastic fuel tank systems. FIG. 1 illustrates one embodiment of a portion of a plastic fuel tank system 10. The plastic fuel tank system 10 includes plastic that is a cross-section portion of a plastic fuel tank 12, at least one object that is a fuel system component 14 and at least one adapter 16.

The plastic fuel tank 12 is a container that includes an interior wall 22 and an exterior wall 24. The plastic fuel tank 12 is formed of plastic, or plastic composite material, and typically includes a hydrocarbon barrier to prevent diffusion of hydrocarbon molecules to the exterior of the plastic fuel tank 12. The plastic may be monolayer, coextruded, composite laminate or any other type of plastic formation.

In one embodiment, the plastic is thermoplastic that includes six layers. The first layer is an outer layer that includes high-density polyethylene (HDPE) and carbon black. The second layer is an inner layer positioned adjacent to the first layer and includes reground thermoplastic material. A third layer, positioned adjacent the second layer, is also an inner layer and includes adhesive polymer. Positioned adjacent the third layer is a fourth layer that includes ethylene vinyl alcohol (EVOH). The EVOH layer of this embodiment provides a hydrocarbon barrier for reduction of the emission of hydrocarbons permeating through the thermoplastic. A fifth layer is positioned adjacent the fourth layer and includes adhesive polymer. The sixth layer forms the other outer layer adjacent to the fifth layer and includes HDPE. In other embodiments, different compositions, arrangements and quantities of layers may be used to form the plastic.

The plastic is formed into the plastic fuel tank 12 by manufacturing processes such as, for example, blow molding or twinsheet thermoforming. Blow molding uses a continuous extrusion process to produce molten plastic. The molten plastic is extruded as a hollow parison and formed to a mold. Twinsheet thermoforming uses preformed thermoplastic sheets that are heated to a molten state and formed to a mold. An exemplary twinsheet thermoforming technique is disclosed in a co-pending patent application entitled "HIGH VOLUME PRODUCTION OF LOW PERMEATION PLASTIC FUEL TANKS USING PARALLEL OFFSET TWINSHEET PRESSURE FORMING" Ser. No. 09/922,059 filed the same day as the present application, which is herein incorporated by reference in its entirety.

The fuel system component 14 may be any object mounted on, or in, the plastic fuel tank 12. Exemplary fuel system components 14 include valves, hoses, pumps, camlock rings, structural enhancements and other fuel system related mechanisms and features. In the illustrated embodiment, the fuel system component 14 is a valve that includes a fitting 26 and a hose 28 to transport fuel through the valve. Further detail regarding installation of fuel system components in plastic fuel tanks is disclosed in a co-pending patent application entitled "LOW HYDROCARBON EMISSION FUEL TANK WITH INTERNAL COMPONENTS" Ser. No. 09/921,541 filed the same day as the present application, which is herein incorporated by reference in its entirety. In other embodiments, any other object may be substituted for the fuel system component 14.

The adapter 16 of this embodiment is positioned between the plastic fuel tank 12 and the fuel system component 14. The adaptor 16 provides a rigid mount to maintain the distance between the plastic fuel tank 12 and the fuel system component 14. In addition, the adaptor 16 provides a flexible mount to allow some independent movement of the plastic fuel tank 12 and the fuel system component 14.

In the illustrated embodiment, the fuel system component 14 and the adapter 16 are depicted as mounted on the interior wall 22 of the plastic fuel tank 12. In other embodiments, the adapter 16 may be mounted on the exterior wall 24 of the plastic fuel tank 12. In still other embodiments, the adapter 16 may be used to mount any object on the surface of anything formed of plastic. In addition to providing a mechanism for attachment of an object to plastic, the adaptor 16 may also provide an interface between incompatible materials, namely, the plastic and the object mounted thereon.

Figure 2:
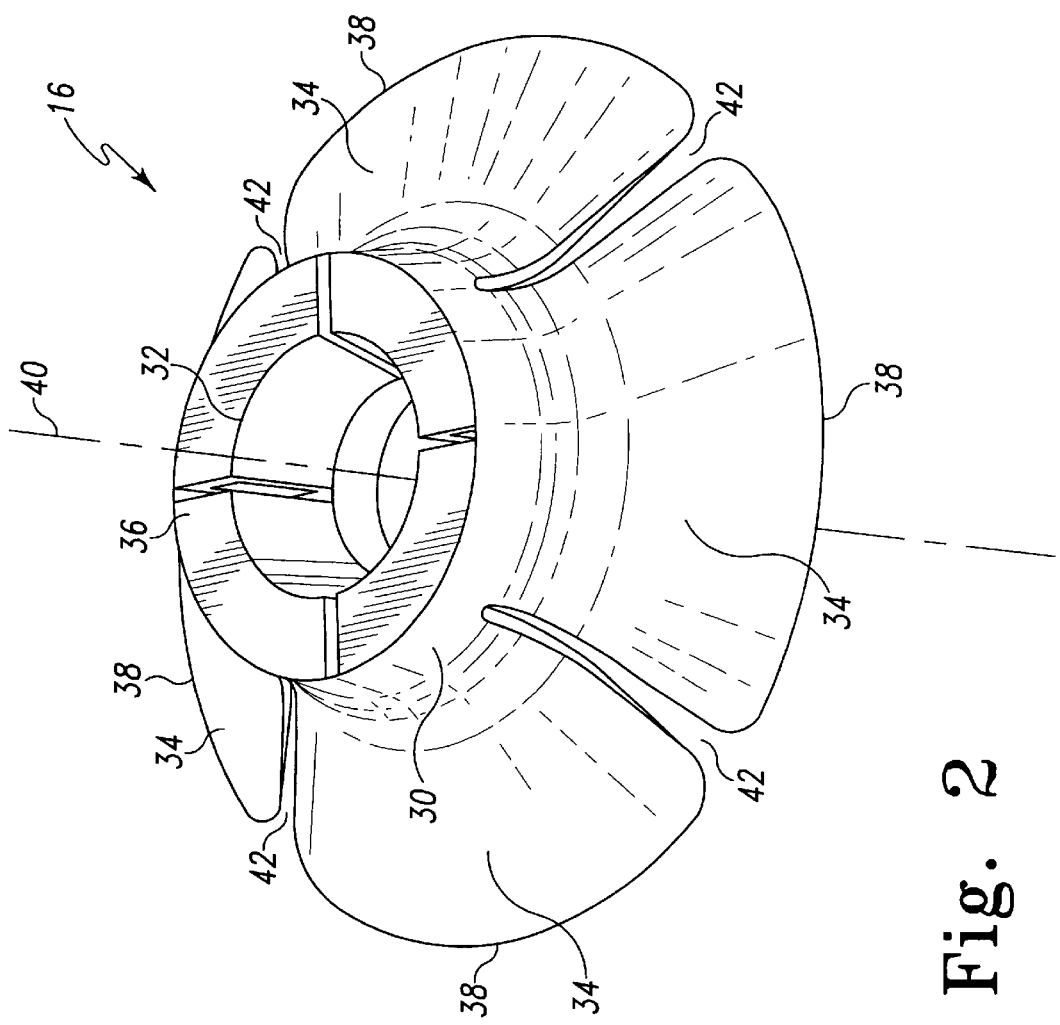
FIG. 2 is a perspective view of the adapter illustrated in FIG. 1.

FIG. 2 is a perspective view of one embodiment of the adapter 16. The adapter 16 includes a body 30, a coupling mechanism 32 and a plurality of feet 34. The coupling mechanism 32 forms a distal end 36 and the feet 34 form a proximal end 38 of the adaptor 16. The adapter 16 of one embodiment is formed from plastic resin similar to the plastic resin forming the plastic fuel tank 12 (FIG. 1). In other embodiments, plastic resin in combination with other materials, such as, for example, nylon, steel, aluminum or any other material may be used to form the adapter 16. In still other embodiments, the adapter 16 may include additional feet 34 in place of the coupling mechanism 32.

The adapter 16 of one embodiment is a single continuous structure that includes the body 30, the coupling mechanism 32 and the feet 34 as integral components formed therein. In another embodiment, the adapter 16 includes the body 30, the coupling mechanism 32 and the feet 34 as three separate components connected by, for example, glue, welding, snap-fit, friction fit, screw-fit and/or any other form of coupling to achieve a rigid connection. In this embodiment, the separate components may be formed of different materials or the same materials.

The body 30 may be hollow or solid, and formed in any shape capable of fixedly maintaining the position of the coupling mechanism 32 with respect to the feet 34. The body 30 of the illustrated embodiment is a hollow, cylindrically shaped housing longitudinally extending along a central axis 40 of the adapter 16.

In one embodiment, where the body 30, the coupling mechanism 32 and the feet 34 form integral components of a continuous structure, the body 30 is hollow. In this embodiment, the body 30 is formed with a relatively thick wall thickness at the distal end 36 progressively tapering to a relatively thin wall thickness at the proximal end 38. In another embodiment, the body 30 may have a uniform wall thickness. In yet another embodiment, the wall thickness may be relatively thin at both the distal and proximal ends 36, 38 progressively tapering to be relatively thick near the middle region of the body 30.

The coupling mechanism 32 may be any form of coupling for fixedly mounting an object, such as, for example, a fuel system component 14 (FIG. 1) to the adapter 16. In the illustrated embodiment, the coupling mechanism 32 is integrally formed with the body 30 as the female side of a snap fit connection. In other embodiments, the coupling mechanism 32 may be the male side of a snap-fit connection, a screw connection, a friction fit, a clamp, a keeper, a latch, or any other device capable of mechanically coupling the adapter 16 with an object. In yet another embodiment, the coupling mechanism 32 may be formed in a shape conducive to riveting, stapling, welding, heat staking and/or any other technique for creating a fixed connection to an object. The coupling mechanism 32 of another embodiment includes provisions for molding the adapter 16 to an object. In still another embodiment, the coupling mechanism 32 includes provisions for overmolding an object with the adapter 16 to overcome die-lock conditions in a single-shot process.

The feet 34 are at least two members formed in any shape capable of providing stiffness for forces acting in parallel with the central access 40. In addition, the feet 34 provide lateral flexibility for forces acting in directions other than parallel with the central axis 40. The feet 34 are formed to mount on a surface of plastic such as, for example, the plastic fuel tank 12 (FIG. 1). In the illustrated embodiment, the feet 34 generally form a "flower petal" or "segmented funnel" shape concentric with the central axis 40. Each of the "flower petals" or "funnel segments" comprises each of the feet 34. The feet 34, in conjunction with the surface of the plastic the adaptor 16 is mounted on, generally define a conical or cup shaped cavity within the adaptor 16. In other embodiments, the feet 34 and the surface of the plastic may generally form a rectangular, elliptical, square or any other shape cavity.

In the illustrated embodiment, the feet 34 and the body 30 are integrally formed as a continuous structure. The body 30 may be formed first and the feet 34 formed therefrom. In this embodiment, the body 30 is formed as one continuous longitudinally extending hollow housing that includes the distal end 36 and the proximal end 38. The body 30 is further processed to form the feet 34. More specifically, a plurality of slits 42 are formed in the body 30 extending from the proximal end 38 a predetermined distance towards the distal end 36.

The portions of the body 30 adjacent the slits 42 are bent to extend outwardly, away from the central axis 40, to form the feet 34. Accordingly, the size and shape of each of the feet 34 is defined by the slits 42. In addition, the slits 42 ensure adequate flexibility of the feet 34. Further, the slits 42 maintain liquid communication between air enclosed within the adapter 16 and air external to the adapter 16.

In another embodiment, the feet 34 are formed as an independent structure that is coupled with the body 30. The feet 34 of this embodiment may be independently coupled with the body 30, or may be coupled with a common frame that includes provisions to couple with the body 30. The feet 34 extend away from the body separated by the slits 42 and are similar to the previously described embodiments.

The feet 34 are preferably formed of material compatible with the surface of the plastic. In one embodiment, the material forming the feet 34 is a plastic resin similar to the plastic. The plastic resin may be molded to progressively taper such that the thinnest part of the feet 34 are at the proximal end 38 and the feet 34 become progressively thicker towards the central axis 40. In one such embodiment, the thickness of each of the feet 34 at the proximal end 38 are about one millimeter and the thickness where each of the feet 34 are no longer separated by the slits 42 is about three millimeters. The thinnest part of the feet 34 is preferably formed to maximize the surface area capable of contacting the surface of the plastic. In other embodiments, the feet 34 are uniform thickness. In still other embodiments, the feet 34 include regions of various thickness strategically formed to enhance flexibility and/or structural support in the feet 34.

Figure 3:
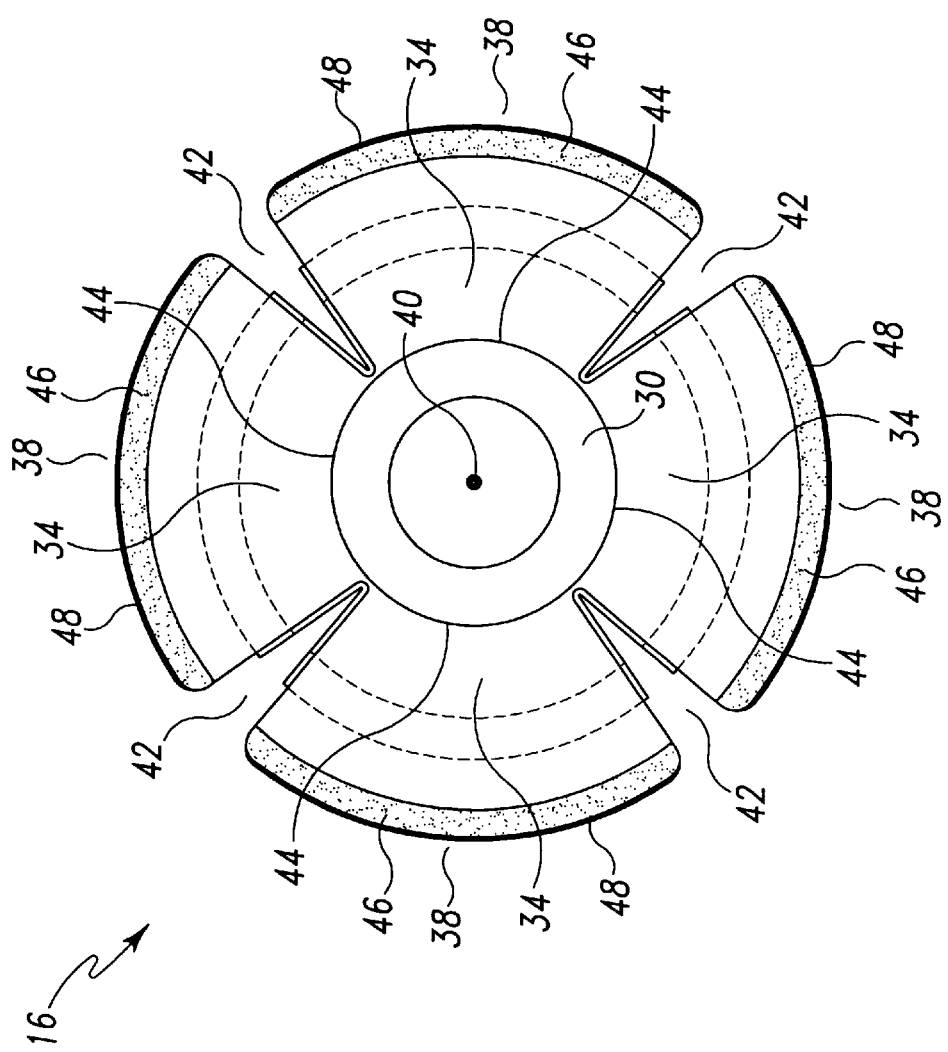
FIG. 3 is a bottom view of the adapter illustrated in FIG. 2.

FIG. 3 is a bottom view of the embodiment of the adapter 16 illustrated in FIG. 2. In the illustrated embodiment, four of the feet 34 are uniformly positioned to extend away in different directions from the central axis 40 of the adaptor 16. In other embodiments, additional or fewer feet 34 may be included. The feet 34 of the illustrated embodiment include a distal end 44 in the area where the feet 34 are no longer separated by the slits 42 and a proximal end that is the proximal end 38.

The feet 34 also include a weld zone 46. The weld zone 46 of the illustrated embodiment forms an annular ring intermittently interrupted by the slits 42. In other embodiments, depending on the configuration of the feet 34, the weld zone 46 may form other intermittently interrupted shapes. The weld zone 46 of the illustrated embodiment is a relatively flat surface extending from the proximal end 38 a predetermined distance approximately perpendicular to the central axis 40. The relatively flat surface is the portion of the feet 34 intended to lie parallel with and contact the surface of the plastic. The term "relatively flat" refers to a surface with a sufficiently smooth and continuous topography to contact the molten plastic over the majority of the surface.

In another embodiment, the weld zone 46 is formed by folding a predetermined portion of the feet 34 near the proximal end 38 to extend back toward the central axis 40.

In this embodiment, the portion of the feet 34 extending back toward the central axis 40 forms a flange. The flange includes the weld zone 46 and the relatively flat surface. The relatively flat surface is approximately perpendicular with the central axis 40 and is intended to lie substantially parallel with, and contact, the surface of the plastic. In yet another embodiment, the weld zone 46 is separately formed and coupled with the feet 34 by one of the previously described techniques.

The weld zone 46 includes a lip 48. In one embodiment, the lip 48 is positioned near the proximal end 38 of each of the feet 34. The lip 48 eliminates sharp edges and provides a smooth, non-invasive edge to minimize disturbances in the surface of the plastic. In one embodiment, the lip 48 is formed by bending a portion of the feet 34 near the proximal end 38 up and away from the relatively flat surface. In another embodiment, the lip 48 is formed by a rounded edge on each of the feet 34.

As best illustrated in FIG. 1, the weld zone 46 (FIG. 3) of the illustrated embodiment forms a weld interface 50 between the adapter 16 and the interior wall 22 of the plastic fuel tank 12. As illustrated in FIGS. 1 and 3, the weld zone 46 presents the relatively flat surface to the interior wall 22. The relatively flat surface of the weld zone 46 along with the lip 48 minimizes production of notch features at the weld interface 50. Production of notch features is minimized since the feet 34 are maintained on the surface of the plastic and displacement of the plastic forming the interior wall 22 is minimal.

In addition, the weld zone 46 presents a large surface area to the interior wall 22. The large surface area improves stability and strength of resulting welds. In addition, the large surface area provides resistance to tilting and decoupling of the adapter 16 from the interior wall 22 during the weld process.

When the adapter 16 is moved into contact with the interior wall 22 the feet 34 are surface welded to the interior wall 22. The surface weld is created when the feet 34 are placed on the surface of the molten plastic forming the interior wall 22. Transfer of the heat contained in the interior wall 22 heats the portion of the feet 34 within the weld zone 46 to a molten state. The interior wall 22 and the feet 34 within the weld zone 46 subsequently melt together to form a rigid bond at the weld interface 50.

In one embodiment, due to the thickness (e.g. low thermal mass) of the feet 34 within the weld zone 46, the molten state is achieved relatively quickly. In another embodiment, the portion of the feet 34 within the weld zone 46 are pre-heated to an elevated temperature prior to placement on the interior wall 22. Elevation of the temperature of the weld zone 46 to a temperature close to that needed to achieve the molten state reduces the time required for the thermal transfer from the interior wall 22. Since the feet 34 are not pre-heated to the molten state, the shape of the feet 34 is retained when placed in contact with the interior surface 22. In addition, since the feet 34 become progressively thicker (e.g. higher thermal mass), the portion of the feet 34 outside the weld zone 46 may not reach a molten state and therefore maintain the shape of the feet 34 during the welding process.

As the weld interface 50 cools, the adapter 16 provides compensation for the stresses that may otherwise be present at the weld interface 50. The stresses may be caused by, for example, differential shrinkage of the interior wall 22 and the feet 34. The differential shrinkage may be caused by, for example, temperature differences between the feet 34 and the interior wall 22.

Figure 4:
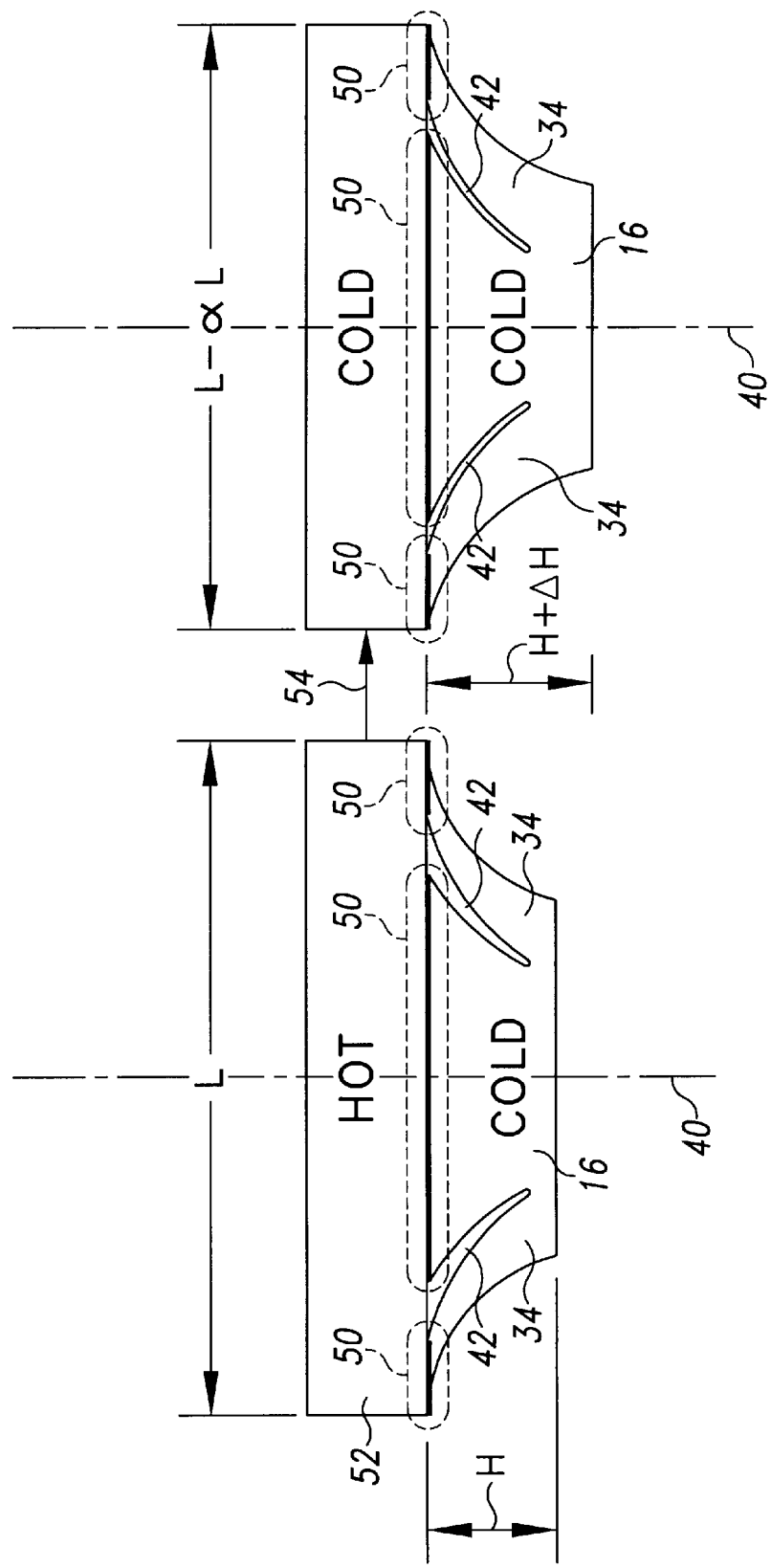
FIG. 4 is a side view of an exemplary application of the adapter in FIG. 2 illustrating the stress relieving properties of the adapter.

FIG. 4 illustratively depicts an adapter 16 identified as at a relatively "COLD" temperature coupled with a piece of plastic 52 identified as heated to a relatively "HOT" temperature to reach a molten state. The piece of plastic 52 has a length (L) and the adapter 16 has a height (H) as illustrated. FIG. 4 also indicates a cooling process with arrow 54 where the piece of plastic 52 is cooled to a relatively "COLD" temperature while the adapter 16 remains at the relatively "COLD" temperature. Following cooling, the piece of plastic 52 now has a length of (L−αL) to indicate contraction that may occur during cooling.

As further illustrated in FIG. 4, the stresses causes by the shrinkage of the piece of plastic 52 are absorbed by the flexibility of the adapter 16. More specifically, the feet 34 of the adapter 16 include sufficient flexibility to bend in response to the lateral movement of the piece of plastic 52. The bending of the feet 34 increases the overall height of the adapter 16 to a height of (H+ΔH). In addition, as illustrated in FIG. 4, and by dotted lines in FIG. 3, the slits 42 between the feet 34 are narrowed and the diameter of the annular ring formed by the weld zone 46 is reduced. Accordingly, local stresses between the surface of the piece of plastic 52 and the weld zone 46 occurring at the weld interface 50 are relieved.

In addition, where the piece of plastic 52 is a portion of a plastic fuel tank 12 (FIG. 1), local stresses caused by non-uniform swelling of the piece of plastic 52 and the adapter 16 in the presence of fuel are also absorbed by the flexible bending of the feet 34. Further, stresses caused by other conditions during operation of the plastic fuel tank 12 may also be absorbed. Such stresses include, for example, transient thermal imbalances due to uneven heating and cooling within the plastic fuel tank system 10 (FIG. 1). Another exemplary source of stresses is dynamic loading caused by lateral movement of the fuel system component 14 (FIG. 1) or fuel within the plastic fuel tank 12. In any situation where forces in directions non-parallel with the central axis 40 impart stresses on the adapter 16 and the piece of plastic 52 the feet 34 may absorb the stresses created.

As illustrated in FIGS. 1–4, the previously discussed embodiments of the adapter 16 are capable of fixedly coupling an object to plastic while the plastic is in a molten state. The adaptor 16 provides relatively high vertical stiffness while providing lateral flexibility capable of relieving stresses in the weld interface 50 formed between the adapter 16 and the plastic. In addition, the weld interface 50 is a surface weld to reduce the likelihood of fatigue fractures as well as avoid compromise of the surface of the plastic. The adapter 16 forms a sufficiently strong and stable bond with the surface of the plastic to permanently mount objects. In addition, the adapter 16 includes a mounting mechanism 32 to fixedly couple objects to the surface of the plastic.

In one embodiment, the adapter 16 may be advantageously applied during manufacture of a plastic fuel tank 12. In this embodiment, the adapter 16 provides a surface mount for fuel system components 14 on the interior wall 22 of the plastic fuel tank 12. The adapter 16 is placed inside the plastic fuel tank 12 during manufacturing and welds to the surface of the interior wall 22 without compromising the hydrocarbon barrier. As such, the adapter 16 allows internalization of fuel system components 14 to minimize leakage and/or permeation of fuel vapors from within the plastic fuel tank 12.

While the invention has been described above by reference to various embodiments, it will be understood that many changes and modifications can be made without departing from the scope of the invention. For example, the adaptor 16 may accommodate mounting multiple objects or provide a structural support function between two plastic surfaces. It is therefore intended that the foregoing detailed description be understood as an illustration of the presently preferred embodiments of the invention, and not as a definition of the invention. It is only the following claims, including all equivalents that are intended to define the scope of this invention.

What is claimed is:

1. An adapter for mounting an object on a plastic object while the plastic object is in a molten state, the adapter comprising:
    a body;
    at least two feet coupled with the body, the feet protruding outwardly from the body in different directions, to form a weld zone the at least two feet weldable to a surface of the plastic object; and
    a coupling mechanism coupled with the body, the coupling mechanism capable of coupling the object with the body.

2. The adapter of claim 1, wherein the thickness of each of the at least two feet decreases as the at least two feet protrude outwardly from the body.

3. The adapter of claim 1, wherein the feet absorb stresses generated between the adaptor and the surface of the plastic object.

4. The adapter of claim 1, wherein the at least two feet comprise plastic resin.

5. The adapter of claim 1, wherein the at least two feet and the body comprise one continuous structure.

6. The adapter of claim 1, wherein the at least two feet are operable to melt together with the surface of the plastic object to form a surface weld.

7. The adapter of claim 1, wherein the coupling mechanism comprises at least one of a weld, a snap fit connection, a screw connection, a friction fit, a clamp, a keeper, a latch, provisions to mold to the object and provisions to overmold the object.

8. The adapter of claim 1, wherein the at least two feet include a slit therebetween.

9. The adapter of claim 1, wherein the at least two feet are operable to limit the depth of penetration into the surface of the plastic object.

10. An adapter for use in mounting an object on a plastic object while the plastic object is in a molten state, the adapter comprising:
    a plurality of plastic feet each having a distal end and a proximal end;
    a body coupled with the distal end, the proximal end of each of the plastic feet protruding outwardly from the body to form a weld zone capable of engaging a surface of the plastic object; and
    a coupling mechanism coupled with the body, the coupling mechanism capable of connecting the body with the object.

11. The adapter of claim 10, wherein the thickness of material forming the distal end of each of the plastic feet is less than the thickness of material forming the proximal end of each of the plastic feet.

12. The adapter of claim 10, wherein the surface area of the distal end is smaller than the surface area of the proximal end.

13. The adapter of claim 10, wherein the plastic feet are operable to absorb stresses generated by forces acting other than parallel with the central axis of the adapter.

14. The adapter of claim 10, wherein the coupling mechanism is integrally formed with the object.

15. The adapter of claim 10, wherein the weld zone engages the surface of the plastic by formation of a surface weld.

16. The adapter of claim 10, wherein the weld zone comprises a lip and a relatively flat surface, the lip and the relatively flat surface positionable on the surface of the plastic object.

17. The adapter of claim 10, wherein each of the plastic feet form a segmented funnel shape.

18. The adapter of claim 10, wherein the object comprises material incompatible with the surface of the plastic object.

19. The adapter of claim 10, wherein the plastic feet and the plastic object are formed from compatible materials.

20. An adapter for mounting a fuel system component to a wall of a plastic fuel tank while the wall is in a molten state, the adapter comprising:
    a body including a longitudinally extending hollow housing with a distal end and a proximal end;
    the distal end including a coupling mechanism for connecting the body with the fuel system component;
    a plurality of slits in the body, the slits extending from the proximal end a predetermined distance toward the distal end thereby forming at least two feet that protrude outwardly from the body; and
    a portion of the feet adjacent the slits formed to provide a weld zone near the proximal end, the weld zone weldable to the surface of the wall.

21. The adapter of claim 20, wherein the feet flex in response to forces acting other than parallel with a central axis of the body.

22. The adapter of claim 20, wherein the thickness of the plastic resin forming the weld zone is less than the thickness of the remainder of the body.

23. The adapter of claim 20, wherein a uniform distance between adjacent portions of the body defines the slits.

24. The adapter of claim 20, wherein each portion of the body outwardly extends away from the central axis of the body.

25. The adapter of claim 20, wherein the portion of the body forms a segmented funnel shape.

26. The adapter of claim 20, wherein the weld zone forms an annular ring intermittently broken by the slits.

27. The adapter of claim 20, wherein the weld zone comprises a relatively flat surface and a lip, the relatively flat surface resisting tilting of the adapter or decoupling from the surface of the wall during a weld operation.

* * * * *

UNITED STATES PATENT AND TRADEMARK OFFICE
CERTIFICATE OF CORRECTION

PATENT NO. : 6,726,967 B2
DATED : April 27, 2004
INVENTOR(S) : Erich J. Vorenkamp et al.

It is certified that error appears in the above-identified patent and that said Letters Patent is hereby corrected as shown below:

Title page,
Item [56], References Cited, OTHER PUBLICATIONS, "U.S. Patent Application No. 09/222,059" reference, delete "Vorenkomp" and substitute -- Vorenkamp -- in its place.

Signed and Sealed this

Seventeenth Day of August, 2004

JON W. DUDAS
*Acting Director of the United States Patent and Trademark Office*